US010755668B2

(12) United States Patent
Pasupathi

(10) Patent No.: US 10,755,668 B2
(45) Date of Patent: *Aug. 25, 2020

(54) VARIABLE DISPLAY SIZE FOR AN ELECTRONIC DISPLAY DEVICE

(71) Applicant: International Business Machines Corporation, Armonk, NY (US)

(72) Inventor: Ranjeeth Pasupathi, Coimbatore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/382,399

(22) Filed: Apr. 12, 2019

(65) Prior Publication Data

US 2019/0237039 A1 Aug. 1, 2019

Related U.S. Application Data

(63) Continuation of application No. 15/209,946, filed on Jul. 14, 2016, now Pat. No. 10,319,331.

(51) Int. Cl.
*G09G 5/00* (2006.01)
*G06F 1/16* (2006.01)
*G09G 5/373* (2006.01)
*G06F 3/14* (2006.01)
*G09G 5/14* (2006.01)

(52) U.S. Cl.
CPC .............. *G09G 5/003* (2013.01); *G06F 1/163* (2013.01); *G06F 1/1624* (2013.01); *G06F 1/1647* (2013.01); *G06F 3/1431* (2013.01); *G09G 5/14* (2013.01); *G09G 5/373* (2013.01); *G09G 2300/023* (2013.01); *G09G 2300/026* (2013.01);

(Continued)

(58) Field of Classification Search
None
See application file for complete search history.

(56) References Cited

U.S. PATENT DOCUMENTS 6,906,762 B1 6/2005 Witehira
7,149,557 B2 12/2006 Chadha
(Continued)

OTHER PUBLICATIONS

IBM: List of IBM Patents or Patent Applications Treated As Related (Appendix P), Apr. 23, 2019, 2 pages.
(Continued)

*Primary Examiner* — Kenneth Bukowski
(74) *Attorney, Agent, or Firm* — L. Jeffrey Kelly

(57) ABSTRACT

Disclosed aspects relate to an electronic display device configured for variable display size. The electronic display device may include a housing having a set of slides that form a storage compartment within the housing. The set of slides may include a slot. A primary display panel may be mounted on the front side of the housing. The electronic display device may include an auxiliary display panel of a set of auxiliary display panels that is slidably extendable from the storage compartment within the housing. The auxiliary display panel may be mounted on a slider mount configured to slide the auxiliary display panel through the slot to an extended position adjacent to the primary display panel. The electronic display device may include a display controller to detect a position of the auxiliary display panel and to establish a display arrangement for the primary display panel and the auxiliary display panel.

14 Claims, 7 Drawing Sheets

(52) U.S. Cl.
CPC . *G09G 2330/021* (2013.01); *G09G 2340/045* (2013.01); *G09G 2340/145* (2013.01)

(56) References Cited

U.S. PATENT DOCUMENTS

| | | | |
|---|---|---|---|
| 7,558,057 | B1 | 7/2009 | Naksen |
| D696,693 | S | 12/2013 | Kim |
| 8,738,101 | B1 | 5/2014 | Myr |
| 2004/0228077 | A1 | 11/2004 | Hall |
| 2006/0109197 | A1* | 5/2006 | Kuwabara ............ B60K 35/00 345/1.1 |
| 2013/0275910 | A1* | 10/2013 | Kim ................. G06F 3/0484 715/800 |
| 2014/0184669 | A1 | 7/2014 | Oh |
| 2015/0338888 | A1 | 11/2015 | Kim |
| 2015/0378393 | A1* | 12/2015 | Erad .................. G06F 1/1616 345/1.3 |
| 2018/0018930 | A1 | 1/2018 | Pasupathi |
| 2018/0120901 | A1 | 5/2018 | Jin |

OTHER PUBLICATIONS

Bunton, Cam; "New Samsung patents reveal foldable and scrollable smartphone/tablet designs"; 9to5; <http://9to5google.com/2015/11/30/samsung-foldable-phone-patents/>; Nov. 30, 2015, 3 pages.

Clark, Bryan; "New Samsung patent details rollable, foldable phones and tablets"; The Next Web; <http://thenextweb.com/insider/2015/12/01/new-samsung-patent-details-rollable-foldable-phones-and-tablets/>; Dec. 1, 2015, 4 pages.

Microsoft Corporation; "Guided Help: Dual monitor setup is easy in Windows 7!"; <https://support.microsoft.com/en-us/kb/976064>, Accessed on Apr. 29, 2016, 3 pages.

phoneArena.com; "The future is here: Samsung awarded a patent for a foldable tablet"; <http://www.phonearena.com/news/The-future-is-here-Samsung-awarded-a-patent-for-a-foldable-tablet_id50878>; Jan. 2, 2014, 5 pages.

Purcher, Jack; "Samsung Flex & Multiple Display Devices"; Patently Mobile; <http://www.patentlymobile.com/3b-samsung-flex-displays/>, Mar. 18, 2016, 4 pages.

\* cited by examiner

VARIABLE DISPLAY SIZE FOR AN ELECTRONIC DISPLAY DEVICE

BACKGROUND

This disclosure relates generally to computer systems and, more particularly, relates to adjustable display sizes for an electronic display device. It may be desirable for electronic devices to be flexible and versatile in order to accommodate a variety of user needs. The number of tasks and uses for electronic devices are increasing. As the number of tasks and uses for electronic devices increase, the need for flexibility and versatility for electronic devices may also increase.

SUMMARY

Aspects of the disclosure relate to variable display size for an electronic display device. The electronic display device may be configured to operate in one or more display configurations having varying screen sizes. A set of auxiliary display panels may be packaged in layers behind a primary display panel. In a first display configuration, the set of auxiliary display panels may remain in the storage compartment, and visual elements may be presented on the primary display panel. In a second display configuration, one or more auxiliary display panels of the set of auxiliary display panels may be extended from the storage compartment to positions adjacent to the primary display panel to expand the effective screen size of the electronic display device. In a third display configuration, one or more additional auxiliary display panels of the set of auxiliary display panels may be extended and positioned to provide a further expanded viewing area for the electronic display device. A display controller of the electronic display device may manage the projection and arrangement of screen content to the display panels based on the display configuration of the electronic display device. Leveraging variable screen sizes may facilitate flexibility and versatility of electronic display devices.

Disclosed aspects relate to an electronic display device configured for variable display size. The electronic display device may include a housing having a set of slides that form a storage compartment within the housing. The set of slides may include a slot. A primary display panel may be mounted on the front side of the housing. The electronic display device may include an auxiliary display panel of a set of auxiliary display panels that is slidably extendable from the storage compartment within the housing. The auxiliary display panel may be mounted on a slider mount configured to slide the auxiliary display panel through the slot to an extended position adjacent to the primary display panel. The electronic display device may include a display controller to detect a position of the auxiliary display panel and to establish a display arrangement for the primary display panel and the auxiliary display panel.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
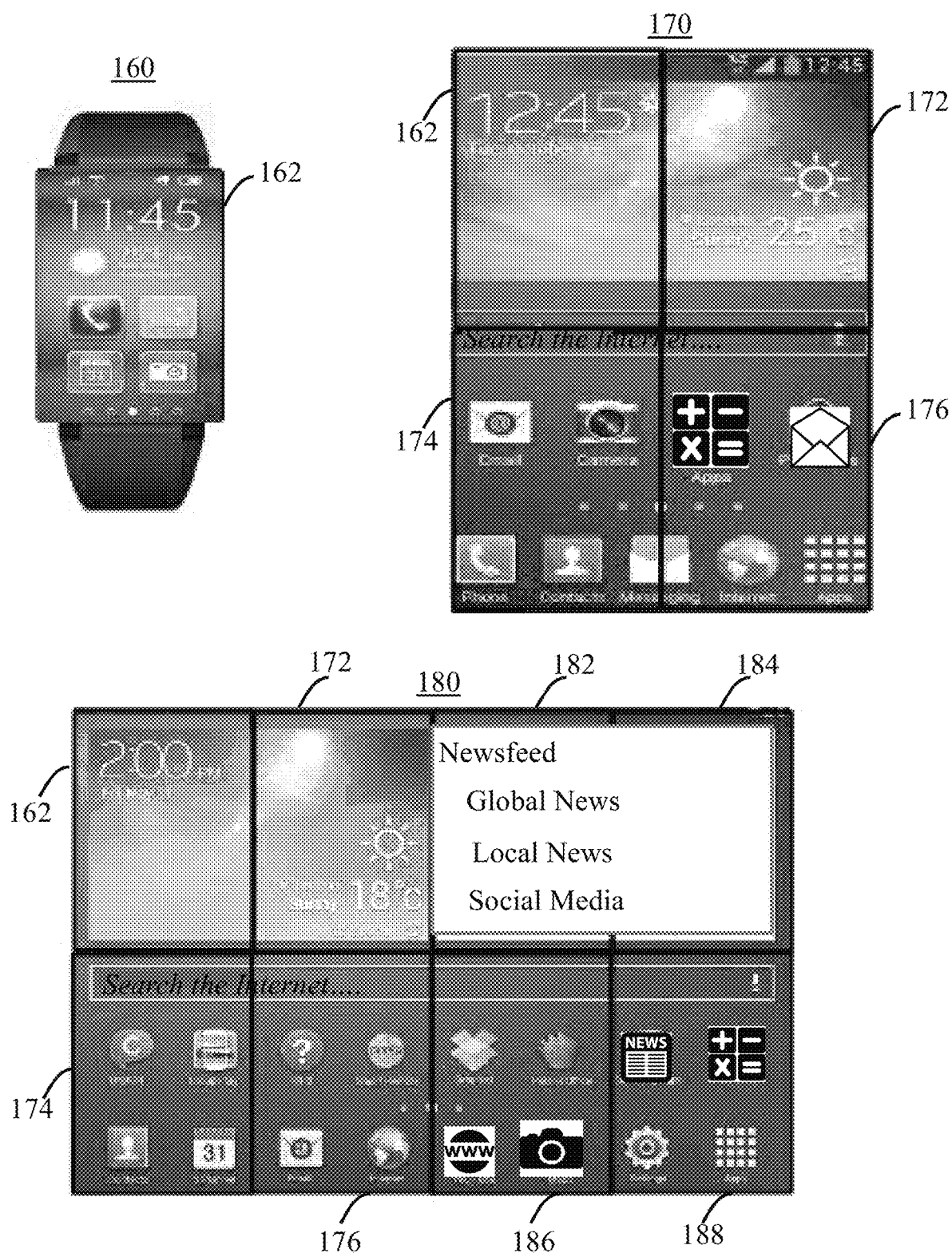
FIG. 1A illustrates example display configurations for an electronic display device, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to variable display size for an electronic display device. The electronic display device may be configured to operate in one or more display configurations having varying screen sizes. A set of auxiliary display panels (e.g., LED, LCD screens) may be packaged in layers behind a primary display panel (e.g., within a storage compartment). In a first display configuration, the set of auxiliary display panels may remain in the storage compartment, and visual elements may be presented on the primary display panel (e.g., smart-watch configuration). In a second display configuration, one or more auxiliary display panels of the set of auxiliary display panels may be extended from the storage compartment to positions adjacent to the primary display panel to expand the effective screen size of the electronic display device (e.g., smart-phone configuration). In a third display configuration, one or more additional auxiliary display panels of the set of auxiliary display panels may be extended and positioned to provide a further expanded viewing area for the electronic display device (e.g., tablet configuration). A display controller of the electronic display device may manage the projection and arrangement of screen content to the display panels based on the display configuration of the electronic display device. Leveraging variable screen sizes may facilitate flexibility and versatility of electronic display devices.

In recent years, the mobile device market has become crowded as device manufacturers create lineups of devices having a variety of different form factors to appeal to consumers. Often, users own multiple mobile devices having different display sizes in order to perform different tasks (e.g., tablet for video conferencing and web-browsing, smart-phone for phone calls and messaging, smart-watch for notification and schedule management). Aspects of the disclosure relate to the recognition that, in some situations, management of multiple mobile devices (e.g., data synchronization between devices, battery life, network access, data security) can become burdensome for users. Accordingly, aspects of the disclosure relate to an electronic display device configured for adjustable display size using a set of auxiliary display panels. Using the set of auxiliary display panels, the screen size of the electronic display device may be configured to one or more different display configurations having varying screen sizes (e.g., smart-watch mode, smart-phone mode, tablet mode). In this way, a single device may replace multiple different devices, affording a user greater flexibility and versatility.

Aspects of the disclosure include a method, system, and computer program product for variable display size for an electronic display device. In embodiments, the electronic display device may include a housing having a set of sides including a front side, a back side, a first lateral side, a second lateral side, a top side and a bottom side that form a storage compartment within the housing. The set of sides may include a slot. A primary display panel may be mounted on the front side of the housing. The electronic display device may include an auxiliary display panel of a set of auxiliary display panels that is slidably extendable from the storage compartment within the housing. The auxiliary display panel may be mounted on a slider mount configured to slide the auxiliary display panel through the slot to an extended position adjacent to the primary display panel. The electronic display device may include a display controller to detect a position of the auxiliary display panel and to establish a display arrangement for the primary display panel and the auxiliary display panel. In embodiments, the electronic display device may include a wearable mobile electronic device.

In embodiments, the electronic display device may be configured to operate in a first usage mode. When in the first usage mode, the set of auxiliary display panels may remain stored in the storage compartment in a stacked display panel configuration, and the display controller may establish a first display arrangement for the primary display panel that achieves a first display size threshold. The first display size threshold may correspond to a smart-watch display criterion.

In embodiments, the electronic display device may be configured to operate in a second usage mode. When in the second usage mode, a first auxiliary display panel may be established in a first extended position adjacent to the primary display panel, a second auxiliary display panel may be established in a second extended position adjacent to the primary display panel, a third auxiliary display panel may be established in a third extended position adjacent to the primary display panel, and a fourth auxiliary display panel may be established in a fourth extended position adjacent to the primary display panel. In embodiments, the first, second, third, and fourth auxiliary panels may be established in the first, second, third, and fourth extended positions using a set of slide mountings configured to slide the auxiliary panels to the extended positions. In embodiments, the display controller may establish a second display arrangement for the primary display panel, the first auxiliary display panel, the third auxiliary display panel, and the fourth auxiliary display panel that achieves a second display size threshold. The second display size threshold may be at least twice the first display size threshold and correspond to a smart-phone display criterion. In embodiments, a fifth, sixth, and seventh auxiliary display panel may remain in the storage compartment while the mobile electronic device is in the second usage mode.

In embodiments, the electronic display device may be configured to operate in a third usage mode. When in the third usage mode, the first, second, third, and fourth auxiliary display panels may be established in the first, second, third, and fourth extended positions adjacent to the primary display panel, the fifth auxiliary display panel may be established in a fifth extended position adjacent to the first auxiliary display panel, the sixth auxiliary display panel may be established in a sixth extended position adjacent to the second auxiliary display panel, the seventh auxiliary display panel may be established in a seventh extended position adjacent to the third auxiliary display panel, and the eighth auxiliary display panel may be established in an eighth extended position adjacent to the fourth auxiliary display panel. The display controller may establish a third display arrangement for the primary display panel, the first auxiliary display panel, the second auxiliary display panel, the third auxiliary display panel, the fourth auxiliary display panel, the fifth auxiliary display panel, the sixth auxiliary display panel, the seventh auxiliary display panel, and the eighth auxiliary display panel that achieves a third display size threshold. In embodiments, the third display size threshold may be at least twice the second display size threshold and correspond to a tablet display criterion.

Aspects of the disclosure relate to a method for display size management for an electronic display device having a primary display panel and a set of auxiliary display panels. A display reconfiguration request to modify a display size of the electronic display device may be detected by a display controller of the electronic display device. The display reconfiguration request may include a display size criterion, a battery life criterion, a screen resolution criterion, and a usability criterion. In response to detecting the display reconfiguration request, the display controller may determine a display configuration for the primary display panel and the set of auxiliary display panels. The display configuration may be selected from a group consisting of a smart-watch mode, a smart-phone mode, or a tablet mode. The display controller may establish the display configuration by positioning a subset of the set of auxiliary display panels to adjust the display size of the electronic display device.

In embodiments, establishing the display configuration may include configuring the electronic display device to the smart-watch mode by maintaining the set of auxiliary display panels in a non-active state within a storage compartment of the electronic display device and providing a first display arrangement for the primary display panel that achieves a first display size threshold. In embodiments, establishing the display configuration may include configuring the electronic display device to the smart-phone mode by positioning the first, second, third, and fourth auxiliary display panels to first, second, third, and fourth extended positions adjacent to the primary display panel. In embodiments, a second display arrangement for the primary display panel, the first auxiliary display panel, the second auxiliary display panel, the third auxiliary display panel, and the fourth auxiliary display panel may be provided. In embodiments, establishing the display configuration may include configuring the electronic display device to the tablet mode by positioning the first, second, third, and fourth auxiliary display panels to first, second, third, and fourth extended positions adjacent to the primary display panel, positioning the fifth auxiliary display panel to a fifth extended position adjacent to the first auxiliary display panel, positioning the sixth auxiliary display panel to a sixth extended position adjacent to the second auxiliary display panel, positioning the seventh auxiliary display panel to a seventh extended position adjacent to the third auxiliary display panel, and positioning the eighth auxiliary display panel adjacent to the fourth auxiliary display panel. In embodiments, the display controller may provide a third display arrangement for the primary display panel, the first auxiliary display panel, the second auxiliary display panel, the third auxiliary display panel, the fourth auxiliary display panel, the fifth auxiliary display panel, the sixth auxiliary display panel, the seventh auxiliary display panel, and the eighth auxiliary display panel.

In embodiments, variable display size for an electronic display device may be associated with performance or efficiency benefits (e.g., resource usage, productivity, flexibility, versatility). Aspects may save resources such as battery life, processing, or memory.

Turning now to the figures, FIG. 1A illustrates example display configurations 160, 170, 180 for an electronic display device. Aspects of FIG. 1A relate to an electronic display device configured to operate in one or more display configurations having varying screen sizes. In embodiments, the electronic display device may be configured to operate in a first display configuration 160. In embodiments, the electronic display device may be configured to operate in a second display configuration 170. In embodiments, the electronic display device may be configured to operate in a third display configuration 180. In embodiments, the electronic display device may include a wearable electronic display device configured to be worn or otherwise attached to the body of a user. Leveraging variable screen sizes may facilitate flexibility and versatility of electronic display devices.

In embodiments, the electronic display device may include a set of auxiliary display panels (e.g., LED, LCD screens) packaged in layers behind a primary display panel (e.g., within a storage compartment). In a first display configuration (e.g., first display configuration 160), the set of auxiliary display panels may remain in the storage compartment, and visual elements may be presented on the primary display panel (e.g., smart-watch configuration). In a second display configuration (e.g., second display configuration 170), one or more auxiliary display panels of the set of auxiliary display panels may be extended from the storage compartment to positions adjacent to the primary display panel to expand the effective screen size of the electronic display device (e.g., smart-phone configuration). In a third display configuration (e.g., third display configuration 180), one or more additional auxiliary display panels of the set of auxiliary display panels may be extended and positioned to provide a further expanded viewing area for the electronic display device (e.g., tablet configuration). A display controller of the electronic display device may manage the projection and arrangement of screen content to the display panels based on the display configuration of the electronic display device.

In embodiments, the electronic display device may include a primary display panel 162. The primary display panel 162 may include an electronic visual display for presentation of images, text, or video (e.g., to a user of the electronic display device). As examples, the primary display panel 162 may include light-emitting diode (LED) screens, liquid-crystal displays (LCD), organic light-emitting diode (OLED) displays, or make use of other types of display technology. The primary display panel 162 may be mounted (e.g., fixed, attached) to the front side of a housing of the electronic display device. In embodiments, the electronic display device may include a set of auxiliary display panels that are maintained in a stacked configuration (e.g., layered structure) within a storage compartment of the housing of the electronic display device. The set of auxiliary display panels may be slidably extendable (e.g., configurable to be slid, shifted, or otherwise moved) from the storage compartment within the housing of the electronic display device to an extended position (e.g., expanded or elongated from the original position). For instance, one or more auxiliary display panels of the set of auxiliary display panels may be moved from the storage compartment to an extended position adjacent to the primary display panel 162 to expand the display size of the electronic display device. In embodiments, the electronic display device may include a display controller for managing presentation/output of visual elements to the primary display panel and the set of auxiliary display panels. In certain embodiments, the display controller may be configured to detect the current display configuration of the electronic display device, and adjust the display arrangement (e.g., organization of screen content/visual elements) to be presented on the primary display panel 162 and the set of auxiliary display panels. Aspects of the disclosure relate to using one or more auxiliary display panels of the set of auxiliary display panels to establish one or more display configurations for the electronic display device.

Aspects of the disclosure relate to an electronic display device configured to operate in a first display configuration 160. In embodiments, the first display configuration 160 may correspond to a smart-watch usage mode (e.g., compact form-factor, resource-light operating system, wearable design). In embodiments, when in the first display configuration 160, the electronic display device may be configured to maintain the set of auxiliary display panels in a non-active (e.g., off) state within the storage compartment of the housing, and only use the primary display panel 162 for presentation of visual elements on the display of the electronic display device. In certain embodiments, the display controller may detect that the electronic display device is in the first display configuration 160, and generate a first display arrangement for provision to the primary display panel 162 of the electronic display device. The first display arrangement may include a set of applications or features of the electronic display device that are suited for operation with a compact screen size. As an example, the first display arrangement may include applications that are frequently used (e.g., usage frequency above a threshold level), applications that have specialized operation modes (e.g., smart-watch mode), applications that have low resource requirements (e.g., screen area, processing resources, memory resources), or the like. Other methods of configuring the first display configuration 160 are also possible.

Aspects of the disclosure relate to an electronic display device configured to operate in a second display configuration 170. In embodiments, the second display configuration 170 may correspond to a smart-phone usage mode (e.g., one-handed usage form-factor, lightweight, pocket-size). In embodiments, when in the second display configuration 170, the electronic display device may be configured to utilize one or more auxiliary display panels of the set of auxiliary display panels stored in the storage compartment to expand the screen size of the electronic display device. As an example, three auxiliary display panels including a first auxiliary display panel 172, a second auxiliary display panel 174, and a third auxiliary display panel 176 may be extended from within the storage compartment (e.g., using a set of slide mounts) to positions in the same plane as the primary display panel 162. In embodiments, the three auxiliary display panels may be aligned with the primary display panel 162 such that the primary display panel 162, the first auxiliary display panel 172, second auxiliary display panel 174, and third auxiliary display panel 176 are positioned at the same height. In certain embodiments, the three auxiliary display panels may be connected to the primary display panel 162 via an interlocking mechanism (e.g., magnets, latches, fasteners). In embodiments, the display controller may detect that the electronic display device is in the second display configuration 170, and generate a second display arrangement for provision to the primary display panel 162 as well as the auxiliary display panels used as part of the second display configuration 170 (e.g., the first auxiliary display panel 172, second auxiliary display panel 174, and third auxiliary display panel 176). The second display arrangement may include a set of applications or features of the electronic display device that are suited for operation on a moderate screen size. As an example, the second display arrangement may include applications that use on-screen keyboards (e.g., messaging applications, internet browsers), applications that display pictures or images (e.g., camera application, photograph viewers), or the like. Other methods of configuring the second display configuration 170 are also possible.

Aspects of the disclosure relate to an electronic display device configured to operate in a third display configuration 180. In embodiments, the third display configuration 180 may correspond to a tablet usage mode (e.g., large screen size, two-handed usage form factor). In embodiments, when in the third display configuration 180, the electronic display device may be configured to utilize one or more auxiliary display panels of the set of auxiliary display panels stored in the storage compartment to expand the effective screen size of the electronic display device. In embodiments, the third display configuration 180 may make use of a greater number of auxiliary display panels than the second display configuration 170. As an example, seven auxiliary display panels including the first auxiliary display panel 172, second auxiliary display panel 174, third auxiliary display panel 176, fourth auxiliary display panel 182, fifth auxiliary display panel 184, sixth auxiliary display panel 186, and seventh auxiliary display panel 188 may be extended from within the storage compartment (e.g., using a set of slide mounts) to positions in the same plane as the primary display panel 162. As described herein, the seven auxiliary display panels may be aligned to the same height as the primary display panel 162, and be connected to the primary display panel 162 via an interlocking mechanism (e.g., magnets, latches, fasteners). In embodiments, the display controller may detect that the electronic display device is in the third display configuration 180, and generate a third display arrangement for provision to the primary display panel 162 as well as the auxiliary display panels used as part of the third display configuration 180 (e.g., the first auxiliary display panel 172, second auxiliary display panel 174, third auxiliary display panel 176, fourth auxiliary display panel 182, fifth auxiliary display panel 184, sixth auxiliary display panel 186, and seventh auxiliary display panel 188). The third display arrangement may include a set of applications or features of the electronic display device that are suited for operation on a substantially large screen size. As an example, the third display arrangement may include applications for video viewing (e.g., movie viewing applications, internet video players), video communication (e.g., videoconferencing applications), applications that include a large amount of letters or characters (e.g., e-books), expanded versions of other software applications, or the like. Other methods of configuring the third display configuration 180 are also possible.

Figure 1B:
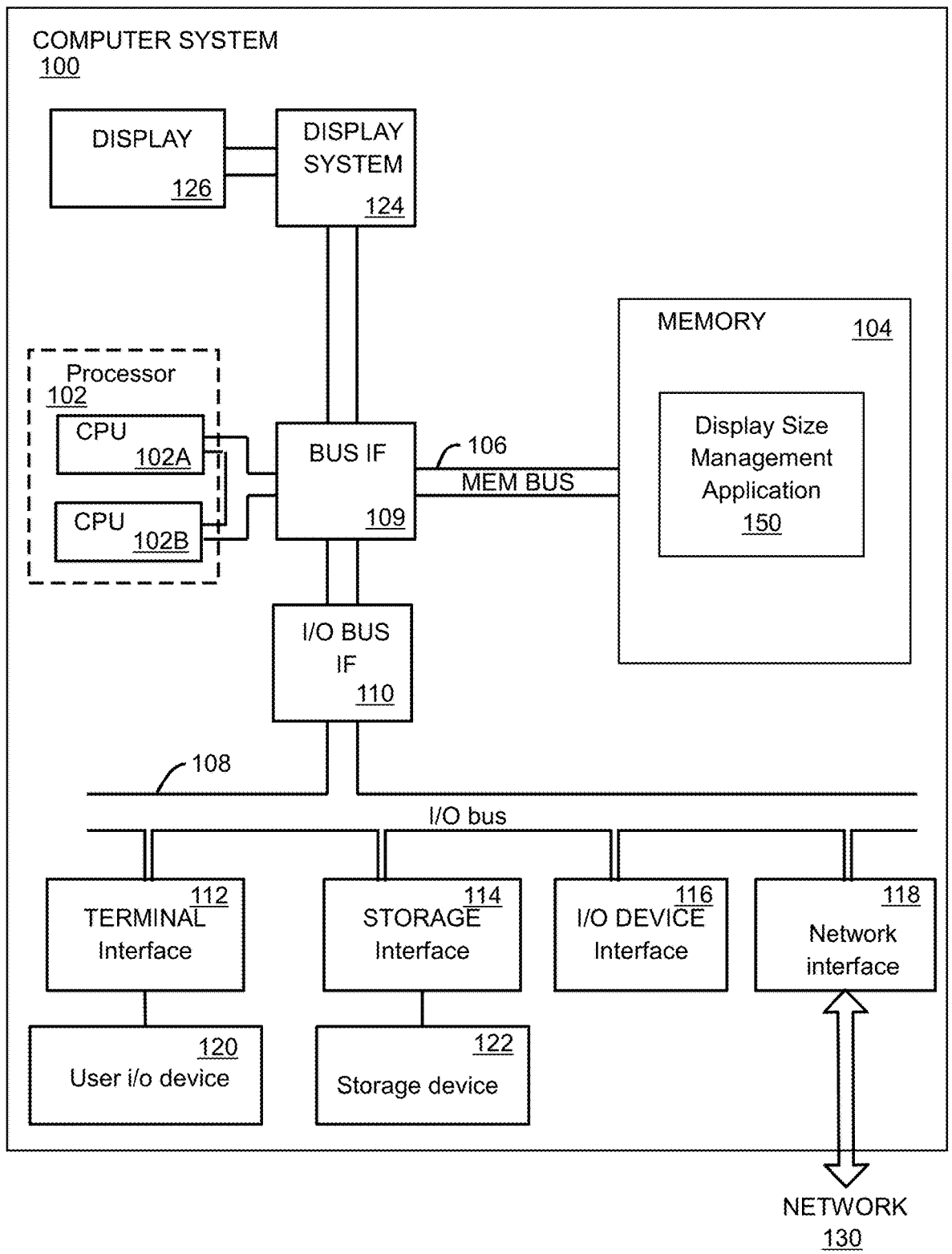
FIG. 1B depicts a high-level block diagram of a computer system for implementing various embodiments of the present disclosure, according to embodiments.

FIG. 1B depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface unit 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a display size management application 150. In embodiments, the display size management application 150 may include instructions or statements that execute on the processor 102 or instructions or statements that are interpreted by instructions or statements that execute on the processor 102 to carry out the functions as further described below. In certain embodiments, the display size management application 150 is implemented in hardware via semiconductor devices, chips, logical gates, circuits, circuit cards, and/or other physical hardware devices in lieu of, or in addition to, a processor-based system. In embodiments, the display size management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1B illustrates a particular bus structure providing a direct communication path among the processors 102, the memory 104, the bus interface unit 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1B depicts several major components of the computer system 100. Individual components, however, may have greater complexity than represented in FIG. 1B, components other than or in addition to those shown in FIG. 1B may be present, and the number, type, and configuration of such components may vary. Several particular examples of additional complexity or additional variations are disclosed herein; these are by way of example only and are not necessarily the only such variations. The various program components illustrated in FIG. 1B may be implemented, in various embodiments, in a number of different manners, including using various computer applications, routines, components, programs, objects, modules, data structures, etc., which may be referred to herein as "software," "computer programs," or simply "programs."

Figure 2:
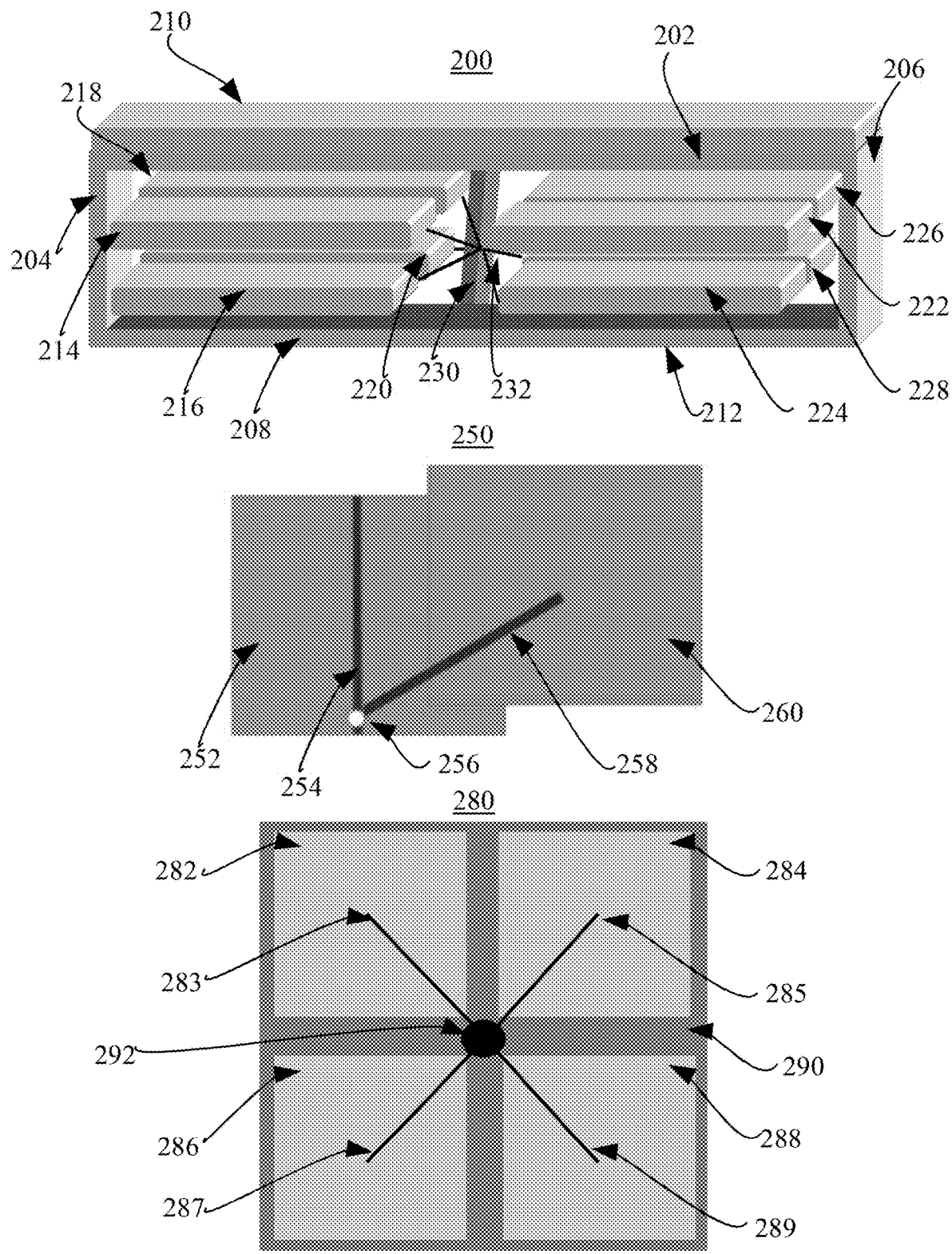
FIG. 2 depicts a multi-view projection of an electronic display device for variable display size, according to embodiments.

FIG. 2 depicts a multi-view projection of an electronic display device for variable display size, according to embodiments. Aspects of FIG. 2 relate to illustrating the components of the electronic display device from several different viewpoints. In embodiments, FIG. 2 may depict a partial cut-away side view 200 of the electronic display device, a bottom view of a slide mount 250, and a partial cut-away bottom view 280 of the electronic display device. Other configurations for the electronic display device beyond those explicitly described herein are also possible.

Consider the partial cut-away side view 200 of the electronic display device. As described herein, the electronic display device may include a primary display panel 210 for presentation of images, text, video or other content (e.g., to a user of the electronic display device.) The primary display panel 210 may be mounted to a side (e.g., front side) of a housing 212 of the electronic display device. The housing 212 may include a set of sides including a first lateral side 204, a second lateral side 206, a top side 202, a bottom side 208, and a front side and back side (not pictured). The housing 212 may form a storage compartment configured to house a set of auxiliary display panels when not in use. In embodiments, the housing 212 may include one or more slots (e.g., openings, apertures, slits, holes) to facilitate extension of the set of auxiliary display panels. For instance, in certain embodiments, a slot may be included in each of the first lateral side 204, second lateral side 206, the front side, and back side of the housing 212.

In embodiments, the set of auxiliary display panels may include a first auxiliary display panel 214, a second auxiliary display panel 216, a third auxiliary display panel 218, a fourth auxiliary display panel 220, a fifth auxiliary display panel 222, a sixth auxiliary display panel 224, a seventh auxiliary display panel 226, and an eighth auxiliary display panel 228. In certain embodiments, the set of auxiliary display panels may remain stored in the storage compartment of the housing 212 in a stacked display panel configuration when not in use (e.g., not extended). As shown in FIG. 2, in certain embodiments, the set of auxiliary display panels may be stacked in four separate stacks each including two auxiliary display panels. Other methods of stacking the set of auxiliary display panels are also possible.

As described herein, each auxiliary display panel may be mounted on a slide mount of a set of slide mounts 232 (e.g., first slider mount for the first auxiliary display panel 214, second slider mount for the second auxiliary display panel 216, third slider mount for the third auxiliary display panel 218, fourth slider mount for the fourth auxiliary display panel 220, fifth slider mount for the fifth auxiliary display panel 222, sixth slider mount for the sixth auxiliary display panel 224, seventh slider mount for the seventh auxiliary display panel 226, eighth slider mount for the eighth auxiliary display panel 228). The set of slide mounts may include joints, pivots, elbows, arms, or other mechanisms configured to facilitate extension of the set of auxiliary display panels from within the housing 212 to extended positions proximate to the primary display panel 210. In embodiments, the set of slide mounts 232 may extend from a slide mount column 230 to corresponding auxiliary display panels of the set of auxiliary display panels. The set of slide mounts 232 may be configured both to extend laterally with respect to the slide mount column 230 as well as to pivot about the slide mount column 230. Other methods of structuring the components of the electronic display device are also possible.

Consider the bottom view of the slide mount 250. A first auxiliary display panel 252 may be maintained in a stacked configuration above a second auxiliary display panel 260. A first slide mount 254 may extend from a slide mount column 256 to interface with the first auxiliary display panel 252, and a second slide mount 258 may extend from the slide mount column 256 to interface with the second auxiliary display panel 260. As described herein, the second slide mount 258 may be configured to pivot about the slide mount column 256 to slide the second auxiliary display panel 260 outward relative to the first auxiliary display panel 252. As described herein, in embodiments, the first slide mount 254 and the second slide mount 258 may be configured to extend the first and second auxiliary display panels 252, 260 outward from the housing 212 through a slot in the housing to expand the screen size of the of the electronic display device. Other methods of structuring the slide mounts 254, 258 and slide mount column 256 are also possible.

Consider the partial cut-away bottom view 280 of the electronic display device. A set of auxiliary display panels including a first auxiliary display panel 282, a second auxiliary display panel 284, a third auxiliary display panel 286, and a fourth auxiliary display panel 288 may be maintained in the storage compartment of the housing 290 of the electronic display device. In embodiments, additional auxiliary display panels may be maintained in a stacked display panel configuration above the first, second, third, and fourth auxiliary display panels 282, 284, 286, 288. As described herein, a first slide mount 283, a second slide mount 285, a third slide mount 287, and a fourth slide mount 289 may extend from a slide mount column 292 and interface with the first, second, third, and fourth auxiliary display panels 282, 284, 286, 288, respectively. In embodiments, the first, second, third, and fourth slide mounts 283, 285, 287, 289 may be configured to slide the first, second, third, and fourth auxiliary display panels 282, 284, 286, 288 outward from within the housing 290 to extended positions proximate to the primary display panel (e.g., primary display panel 210 of partial cut-away side view 200) to expand the screen size of the of the electronic display device. Other methods of structuring the components of the electronic display device are also possible.

Figure 3:
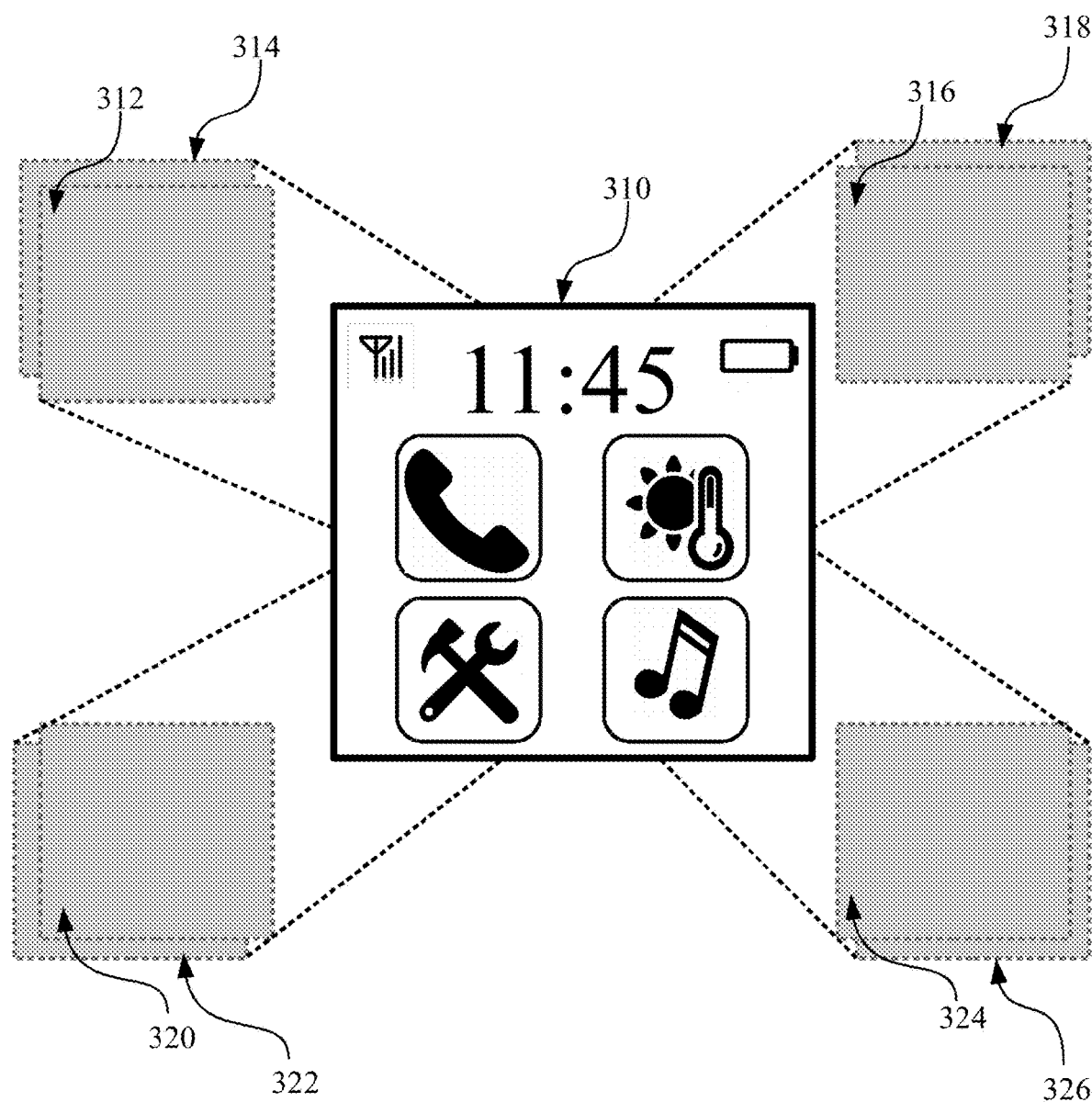
FIG. 3 depicts an electronic display device in a first display configuration, according to embodiments.

FIG. 3 depicts an electronic display device in a first display configuration 300, according to embodiments. Aspects of FIG. 3 relate to an electronic display device configured to operate in a first display configuration 300. In embodiments, the first display configuration 300 may correspond to a smart-watch usage mode (e.g., compact form-factor, resource-light operating system, wearable design). Other arrangements for the first display configuration 300 are also possible.

In embodiments, as described herein, the electronic display device may be configured to operate in a first display configuration 300 in which the set of auxiliary display panels are maintained within a storage compartment of the electronic display device housing in a stacked-panel configuration (e.g., one or more display panels layered atop one another). In certain embodiments, a first subset of the set of auxiliary display panels may be stored in a first quadrant (e.g., portion of the electronic display device), a second subset of the set of auxiliary display panels may be stored in a second quadrant, a third subset of the set of auxiliary display panels may be stored in a third quadrant, and a fourth subset of the set of auxiliary display panels may be stored in a fourth quadrant of the storage compartment. For instance, in embodiments, two auxiliary display panels may be maintained in each quadrant of the storage compartment. As shown in FIG. 3, first and fifth auxiliary display panels 312, 314 may be stored in a first quadrant, second and sixth auxiliary display panels 316, 318 may be stored in a second quadrant, third and seventh auxiliary display panels 320, 322 may be stored in a third quadrant, and fourth and eighth auxiliary display panels 324, 326 may be stored in a fourth quadrant of the storage compartment. As described herein, the set of auxiliary display panels may be configured to be positioned in extended positions proximate to the primary display panel 310 to expand the screen size of the electronic display device. Other methods of stacking and arranging the set of auxiliary display panels are also possible.

In embodiments, a display controller may detect that the electronic display device is in the first display configuration 300 and generate a first display arrangement for provision to the primary display panel 310 of the electronic display device. Generally, a display arrangement may include an organization, composition, or distribution of content (e.g., information, applications, features) for presentation on the electronic display device. Accordingly, in embodiments, the first display arrangement may include a layout of information and applications that are adapted for the first display configuration 300 (e.g., compact screen size). For instance, applications that do not make use of a substantial portion of screen space (e.g., space usage value below a threshold) may be included in the first display arrangement for provision to the primary display panel 310. In embodiments, the first display arrangement may achieve a first display size threshold having a smart-watch criterion. The smart-watch criterion may designate a set of physical dimensions including a length and width of the display area of the electronic display device that correspond to threshold dimensions of a smart-watch. For example, in certain embodiments, the smart-watch criterion may designate a length of 30-50 millimeters, and a height of 25-40 millimeters. Other methods of configuring the first display arrangement are also possible.

Figure 4:
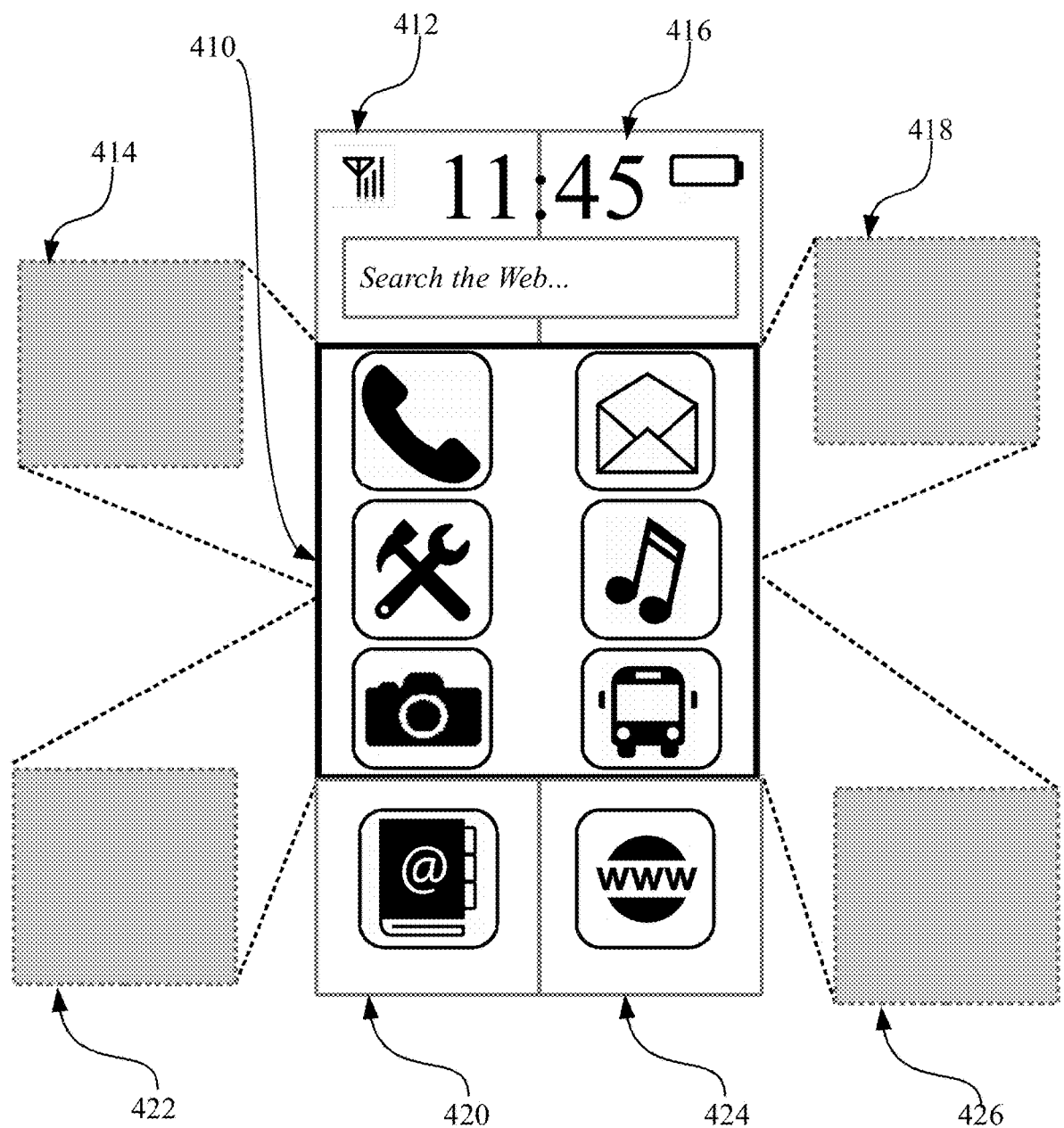
FIG. 4 depicts an electronic display device in a second display configuration, according to embodiments.

FIG. 4 depicts an electronic display device in a second display configuration 400, according to embodiments. Aspects of FIG. 4 relate to an electronic display device configured to operate in a second display configuration 400. In embodiments, the second display configuration 400 may correspond to a smart-phone usage mode (e.g., one-handed usage form-factor, lightweight, pocket-size). Other arrangements for the second display configuration 400 are also possible.

In embodiments, as described herein, the electronic display device may be configured to operate in a second display configuration 400 in which a subset of the set of auxiliary display panels are established in extended positions proximate to the primary display panel 410. In certain embodiments, one auxiliary display panel may be extended from each quadrant of the storage compartment to expand the screen size of the electronic display device while one or more auxiliary display panels may remain stored within each quadrant of the storage compartment. As shown in FIG. 4, a first auxiliary display panel 412 and a second auxiliary display panel 416 may be extended from the storage compartment of the electronic display device to first and second extended positions adjacent to (e.g., interfacing with a top side of) the primary display panel 410, and a third auxiliary display panel 420 and a fourth auxiliary display panel 424 may be extended from the storage compartment to third and fourth extended positions adjacent to (e.g., interfacing with a bottom side of) the primary display panel 410. In embodiments, fifth, sixth, seventh, and eighth auxiliary display panels 414, 418, 422, and 426 may be maintained within the storage compartment of the electronic display device. In this way, the overall viewing area (e.g., space available for presentation of information and applications) of the electronic display device may be increased. In embodiments, the total display size of the electronic display device in the second display configuration 400 may achieve a second display size threshold that is at least twice a first display size threshold of the first display configuration 300. As an example, in certain embodiments, the first display size threshold may be 2 inches by 3 inches, and the second display size threshold may be 4 inches by 6 inches (e.g., the length and width of the electronic display device in the second display configuration 400 are double the respective length and width of the electronic device in the first display configuration 300). Other methods of structuring the second display configuration 400 are also possible.

In embodiments, a display controller may detect that the electronic display device is in the second display configuration 400 and generate a second display arrangement for provision to the primary display panel 410 and the first, second, third, and fourth auxiliary display panels 412, 416, 420, 424. In embodiments, the second display arrangement may include a layout of information and applications that are adapted for the second display configuration 400 (e.g., moderate screen size). As examples, the second display arrangement may include applications that use on-screen keyboards (e.g., messaging applications, internet browsers), applications that display pictures or images (e.g., camera application, photograph viewers), or the like. In embodiments, the second display arrangement may achieve a second display size threshold having a smart-phone criterion. The smart-phone criterion may designate a set of physical dimensions including a length and width of the display area of the electronic display device that correspond to threshold dimensions of a smart-phone. For example, in certain embodiments, the smart-phone criterion may designate a length of 65-85 millimeters, and a height of 120-160 millimeters. Other methods of generating the second display arrangement are also possible.

Figure 5:
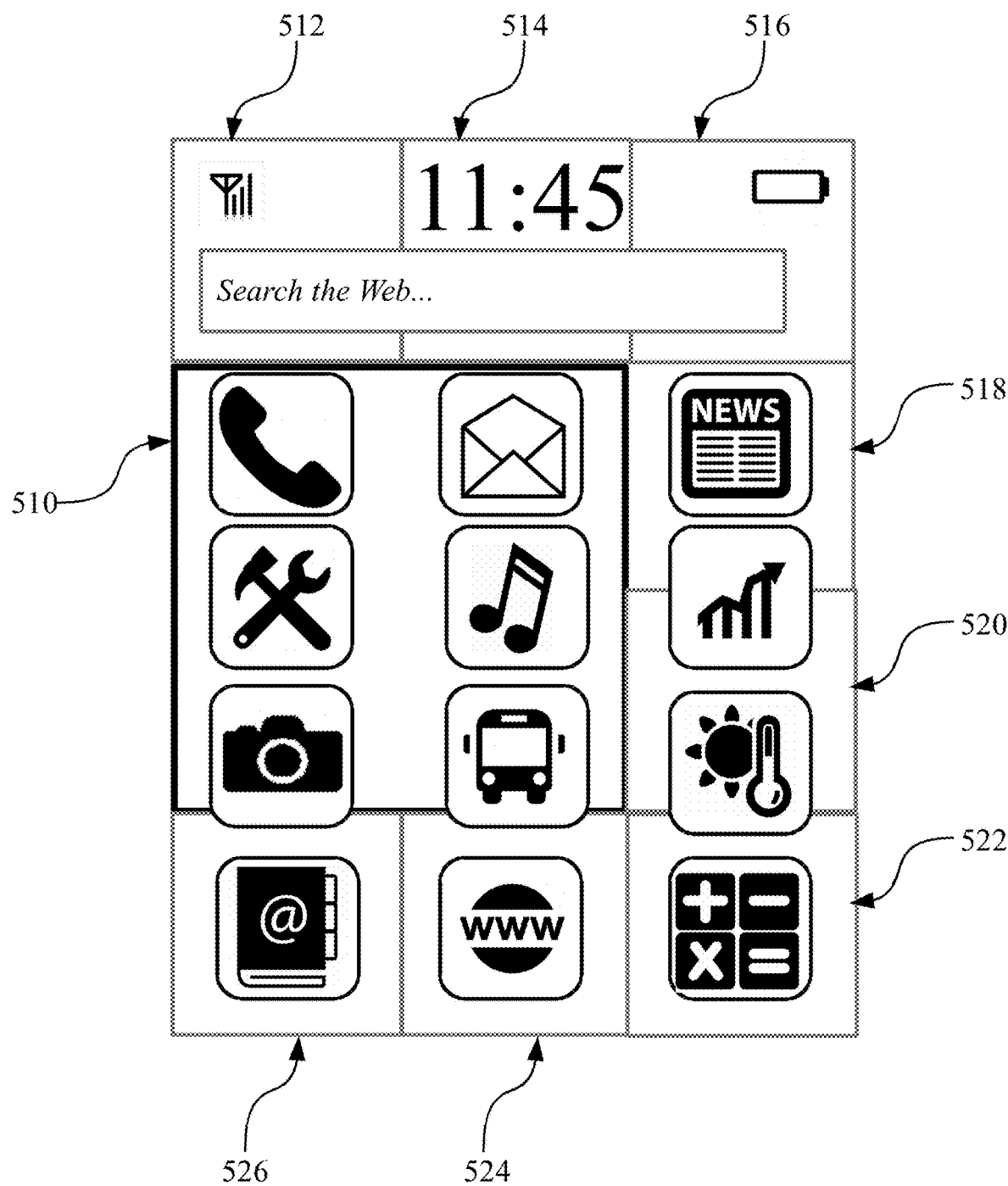
FIG. 5 depicts an electronic display device in a third display configuration, according to embodiments

FIG. 5 depicts an electronic display device in a third display configuration 500, according to embodiments. Aspects of FIG. 5 relate to an electronic display device configured to operate in a third display configuration 500. In embodiments, the third display configuration 500 may correspond to a tablet usage mode (e.g., large screen size, two-handed usage form factor). Other arrangements for the third display configuration 500 are also possible.

In embodiments, as described herein, the electronic display device may be configured to operate in a third display configuration 500 in which a subset of the set of auxiliary display panels are established in extended positions to increase the display area of the electronic display device. In certain embodiments, the subset of auxiliary display panels may include the entire set of auxiliary display panels. For instance, each of the auxiliary display panels maintained in the storage compartment may be slid outward from one of either the first, second, third, or fourth quadrants using a set of slide mounts to extended positions proximate to (e.g., adjacent or diagonal) to the primary display panel 510. As shown in FIG. 5, first and fifth auxiliary display panels 512, 514 may be extended from a first quadrant of the storage compartment to first and fifth extended positions adjacent to (interfacing with a top side) of the primary display panel 510, second and sixth auxiliary display panels 516, 518 may be extended from a second quadrant of the storage compartment to second and sixth extended positions, third and seventh auxiliary display panels 520, 522 may be extended from a third quadrant of the storage compartment to third and seventh extended positions, and fourth and eighth auxiliary display panels 524, 526 may be extended from a fourth quadrant of the storage compartment to fifth and eighth extended positions (e.g., interfacing with a bottom side) of the primary display panel 510. In this way, the overall viewing area (e.g., space available for presentation of information and applications) of the electronic display device may be increased. In embodiments, the total display size of the electronic display device in the third display configuration 500 may achieve a third display size threshold that is at least twice a second display size threshold of the second display configuration 400. As an example, in certain embodiments, the second display size threshold may include a total screen area of 24 square inches (e.g., width of 4 inches and a height of 6 inches), and the third display size threshold may include a total screen area of 60 square inches (e.g., width of 8 inches and a height of 12 inches). Other methods of structuring the third display configuration 500 are also possible.

In embodiments, a display controller may detect that the electronic display device is in the third display configuration 500 and generate a third display arrangement for provision to the primary display panel 510 and the first, second, third, fourth, fifth, sixth, seventh, and eighth display panels 512, 514, 516, 518, 520, 522, 524. In embodiments, the third display arrangement may include a layout of information and applications that are adapted for the third display configuration 500 (e.g., large screen size). As examples, the third display arrangement may include applications for video viewing (e.g., movie viewing applications, internet video players), video communication (e.g., videoconferencing applications), applications that include a large amount of letters or characters (e.g., e-books), expanded versions of other software applications, or the like. In embodiments, the third display arrangement may achieve a third display size threshold having a tablet criterion. The tablet criterion may designate a set of physical dimensions including a length and width of the display area of the electronic display device that correspond to threshold dimensions of a tablet device. For example, in certain embodiments, the tablet criterion may designate a length of 260-320 millimeters, and a height of 160-230 millimeters. Other methods of configuring the first display configuration 300 are also possible.

Figure 6:
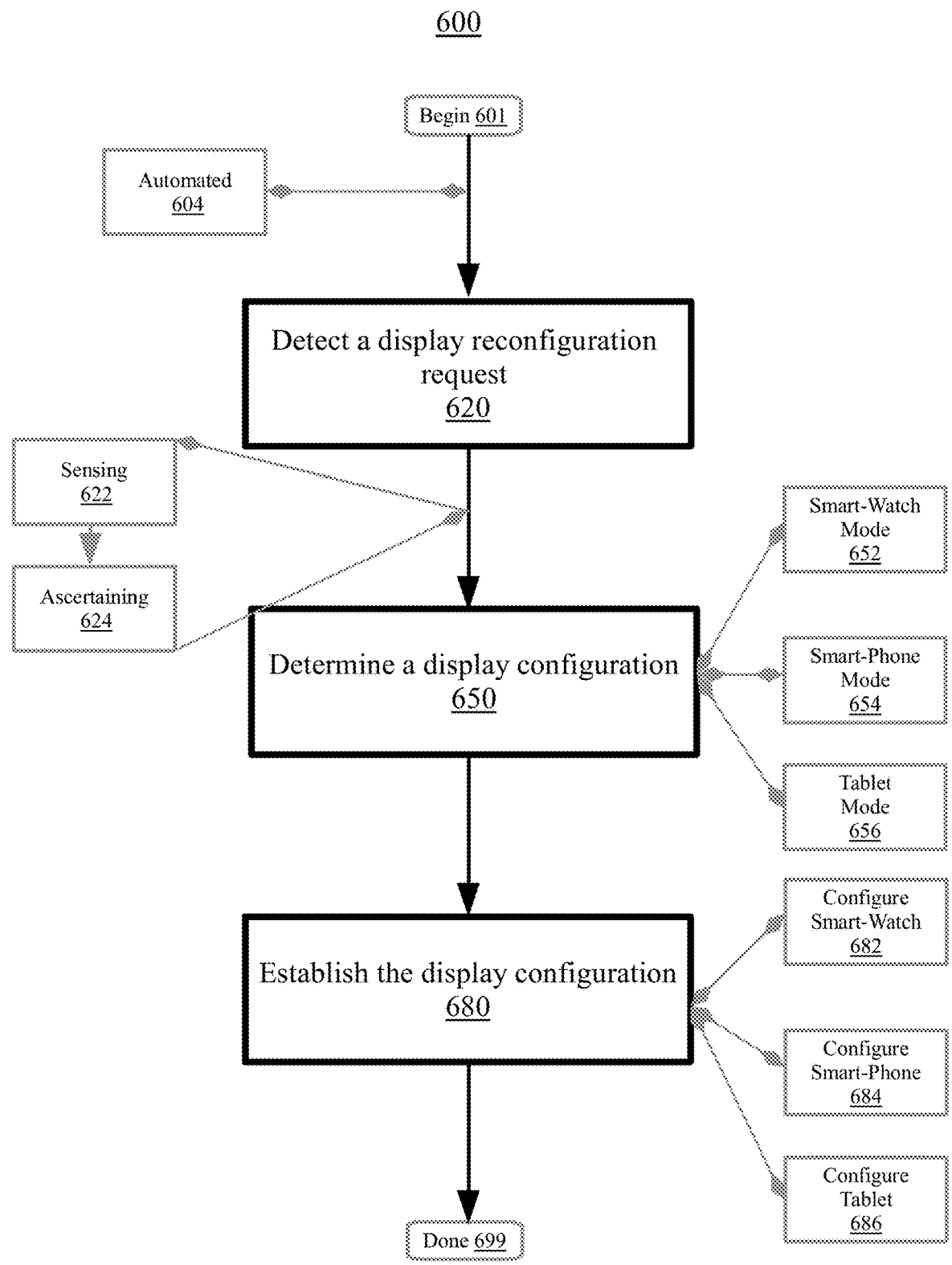
FIG. 6 is a flowchart illustrating a method for display size management for an electronic display device, according to embodiments.

FIG. 6 is a flowchart illustrating a method 600 for display size management for an electronic display device, according to embodiments. Aspects of the disclosure relate to adjusting the display size of an electronic display device by utilizing one or more auxiliary display panels of a set of auxiliary display panels. In embodiments, the set of auxiliary display panels may be used in conjunction with a primary display panel to convert the electronic display device between a first (e.g., smart-watch), second (e.g., smart-phone), and third (e.g., tablet) display configuration that each have different display sizes. Leveraging variable screen sizes may facilitate flexibility and versatility of the electronic display device. The method 600 may begin at block 601.

In certain embodiments, the detecting, the determining, the establishing, and other steps described herein may each occur in an automated fashion without user intervention at block 604. In embodiments, the detecting, the determining, the establishing, and other steps described herein may be carried out by an internal display size management application maintained in a persistent storage device of the electronic display device. In certain embodiments, the steps described herein may be carried out by an external display size management module hosted by a remote computing device or server (e.g., accessible via a subscription, usage-based, or other service model).

At block 620, a display reconfiguration request may be detected by a display controller of the electronic display device. Generally, detecting can include sensing, discovering, ascertaining, identifying, or otherwise receiving the display reconfiguration request. In embodiments, the display reconfiguration request may include a command (e.g., from a user), triggering event (e.g., particular threshold achieved), or other indication to modify the display size of the electronic display device. As an example, in embodiments, detecting the display reconfiguration request may include receiving instructions from a user of the electronic display device to increase or decrease the screen size of the electronic display device (e.g., via a button press, dialogue box selection, setting/parameter configuration). In embodiments, the display reconfiguration request may include a battery life criterion (e.g., battery life below a threshold), a screen resolution criterion (e.g., recommended resolution for a particular display size), or a usability criterion (e.g., larger screen size for increased letter readability). As an example, it may be detected that a particular display configuration (e.g., smart-watch mode) should not be used in combination with letters below a threshold font size (e.g., to facilitate readability for a user). Accordingly, in response to detecting that characters below the threshold font size are displayed on the electronic display device, it may be desirable to convert the electronic display device to a larger screen size (e.g., smart-phone mode, tablet-mode) to allow for increased visibility. Other methods of detecting the display reconfiguration request are also possible.

In embodiments, a display controller of the electronic display device may sense that a battery life level of the electronic display device has fallen below a battery life threshold at block 622. Generally, sensing can include detecting, discovering, ascertaining, identifying, or otherwise determining that the battery life of the electronic display device has fallen below the battery life threshold. For instance, sensing may include using a device manager of the electronic display device to survey the usage state of various components of the electronic display device, and ascertaining that the remaining battery life of the electronic display device has fallen below a battery life threshold (e.g., 10%). In response to sensing that the battery life has fallen below the battery life threshold, it may be ascertained to change the display configuration of the electronic display device at block 624. Generally, ascertaining can include identifying, concluding, selecting, or otherwise determining to change the display configuration of the electronic display device. In embodiments, ascertaining to change the display configuration of the electronic display device may include selecting a display configuration that has a smaller screen size (e.g., in order to conserve battery life). Other methods of sensing that the battery life of the electronic display device has fallen below a battery life threshold and ascertaining to change the display configuration of the electronic display device are also possible.

At block 650, a display configuration for the primary display panel and the set of auxiliary display panels may be determined. The display configuration may be determined by the display controller of the electronic display device in response to detecting the display configuration request. Generally, determining can include identifying, concluding, selecting, or otherwise ascertaining to modify, adjust, convert, or change the display configuration of the electronic display device. In embodiments, determining the display configuration for the electronic display device may be based on the detected display reconfiguration request. For instance, in certain embodiments, the display reconfiguration request may specify a desired display configuration for the electronic display device. As another example, initiation or invocation of a particular application on the electronic display device may trigger conversion to a particular display configuration (e.g., initialization of a movie application may prompt conversion to a tablet mode having a larger screen size, initialization of a phone call may prompt conversion to a smart-phone mode). As described herein, the electronic display device may be configured to operate in one or more display configurations. In embodiments, a smart-watch mode (e.g., compact screen size, wearable design) may be determined for the electronic display device at block 652. In embodiments, a smart-phone mode (e.g., one-handed usage form-factor, lightweight, pocket-size) may be determined for the electronic display device at block 654. In embodiments, a tablet mode (e.g., large screen size, two-handed usage form factor) may be determined for the electronic display device at block 656. Other methods of determining the display configuration for the electronic display device are also possible.

At block 680, the display configuration may be established by positioning a subset of the set of auxiliary display panels to adjust the display size of the electronic display device. Generally, establishing can include assembling, forming, converting, instantiating, or otherwise arranging the set of auxiliary display panels to establish the display configuration. As described herein, establishing the display configuration may include configuring the set of auxiliary display panels to one or more of a smart-watch mode, a smart-phone mode, or a tablet-mode. In embodiments, the smart-watch mode may be established at block 682. Establishing the smart-watch mode may include maintaining the set of auxiliary display panels in a non-active state within a storage compartment of the electronic storage device, and providing a first display arrangement that achieves a first display size threshold for the primary display panel. In embodiments, the smart-phone mode may be established at block 684. Establishing the smart-phone mode may include positioning first, second, third, and fourth auxiliary display panels adjacent to the primary display panel (e.g., using a set of slide mounts) and providing a second display arrangement that achieves a second display size threshold (e.g., twice the size of the first display size threshold). In embodiments, the tablet-mode may be established at block 686. Establishing the tablet mode may include positioning first, second, third, and fourth auxiliary display panels adjacent to the primary display panel, a fifth auxiliary display panel adjacent to the first auxiliary display panel, a sixth auxiliary display panel adjacent to the second auxiliary display panel, a seventh auxiliary display panel adjacent to the third auxiliary display panel, an eighth auxiliary display panel adjacent to the fourth auxiliary display panel, and providing a third display arrangement to the primary display panel and the set of auxiliary display panels that achieves a third display size threshold (e.g., twice the size of the second display size threshold). Other methods of establishing the display configuration for the electronic display device are also possible.

Method 600 concludes at block 699. Aspects of method 600 may provide performance or efficiency benefits for display size management for an electronic display device. For example, aspects of method 600 may have positive impacts with respect to determining and establishing a display configuration for the electronic display device. As described herein, the detecting, determining, and establishing described herein may each occur in an automated fashion without user intervention. Altogether, leveraging display size adjustment techniques may promote flexibility and versatility for electronic display devices.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An electronic display device, the device comprising:
   a primary display panel mounted on a front side of a housing;
   an auxiliary display panel of a set of auxiliary display panels is slidably extendable from a storage compartment within the housing, the auxiliary display panel is mounted to an extendable arm and configured to slide through a slot to an extended position adjacent to any one of a first lateral side, a second lateral side, a top side and a bottom side of the primary display panel at any given time, a proximal end of the extendable arm is pivotably coupled to a column, and the auxiliary display panel is pivotably coupled to a distal end of the extendable arm; and
   a display controller to detect a position of the auxiliary display panel and to establish a display arrangement including the primary display panel and the auxiliary display panel.

2. The device of claim 1, wherein the set of auxiliary display panels remain stored in the storage compartment in a stacked configuration.

3. The device of claim 1, wherein:
   a first auxiliary display panel of the set of auxiliary display panels is positioned in a first quadrant of the storage compartment behind the primary display panel;
   a second auxiliary display panel of the set of auxiliary display panels is positioned in a second quadrant of the storage compartment behind the primary display panel;
   a third auxiliary display panel of the set of auxiliary display panels is positioned in a third quadrant of the storage compartment behind the primary display panel;
   a fourth auxiliary display panel of the set of auxiliary display panels is positioned in a fourth quadrant of the storage compartment behind the primary display panel;

a fifth auxiliary display panel of the set of auxiliary display panels is positioned in the first quadrant of the storage compartment, wherein the fifth auxiliary display panel is positioned below the first auxiliary display panel in the first quadrant;

a sixth auxiliary display panel of the set of auxiliary display panels is positioned in the second quadrant of the storage compartment, wherein the sixth auxiliary display panel is positioned below the second auxiliary display panel in the second quadrant;

a seventh auxiliary display panel of the set of auxiliary display panels is positioned in the third quadrant of the storage compartment, wherein the seventh auxiliary display panel is positioned below the third auxiliary display panel in the third quadrant; and an eighth auxiliary display panel of the set of auxiliary display panels is positioned in the fourth quadrant of the storage compartment, wherein the eighth auxiliary display panel is positioned below the fourth auxiliary display panel in the fourth quadrant.

4. The device of claim 1, wherein at least one of the set of auxiliary display panels remains stored in the storage compartment and at least one of the set of auxiliary display panels is positioned in an extended position adjacent to the primary display panel.

5. The device of claim 1, wherein:
a first auxiliary display panel of the set of auxiliary display panels is located in a first extended position adjacent to the primary display panel supported by a first extendable arm configured to slide the first auxiliary display panel from a first quadrant of the storage compartment through the slot to the first extended position;

a second auxiliary display panel of the set of auxiliary display panels is located in a second extended position adjacent to the primary display panel supported by a second extendable arm configured to slide the second auxiliary display panel from a second quadrant of the storage compartment through the slot to the second extended position;

a third auxiliary display panel of the set of auxiliary display panels is located in a third extended position adjacent to the primary display panel supported by a third extendable arm configured to slide the third auxiliary display panel from a third quadrant of the storage compartment through the slot to the third extended position;

a fourth auxiliary display panel of the set of auxiliary display panels is located in a fourth extended position adjacent to the primary display panel supported by a fourth extendable arm configured to slide the fourth auxiliary display panel from a fourth quadrant of the storage compartment through the slot to the fourth extended position;

a fifth auxiliary display panel of the set of auxiliary display panels is positioned in the first quadrant of the storage compartment;

a sixth auxiliary display panel of the set of auxiliary display panels is positioned in the second quadrant of the storage compartment;

a seventh auxiliary display panel of the set of auxiliary display panels is positioned in the third quadrant of the storage compartment; and an eighth auxiliary display panel of the set of auxiliary display panels is positioned in the fourth quadrant of the storage compartment.

6. The device of claim 1, wherein each auxiliary display panel of the set of auxiliary display panels is positioned in an extended position adjacent to the primary display panel.

7. The device of claim 1, wherein:
a first auxiliary display panel of the set of auxiliary display panels is located in a first extended position adjacent to the primary display panel supported by a first extendable arm configured to slide the first auxiliary display panel from a first quadrant of the storage compartment through the slot to the first extended position;

a second auxiliary display panel of the set of auxiliary display panels is located in a second extended position adjacent to the primary display panel supported by a second extendable arm configured to slide the second auxiliary display panel from a second quadrant of the storage compartment through the slot to the second extended position;

a third auxiliary display panel of the set of auxiliary display panels is located in a third extended position adjacent to the primary display panel supported by a third extendable arm configured to slide the third auxiliary display panel from a third quadrant of the storage compartment through the slot to the third extended position;

a fourth auxiliary display panel of the set of auxiliary display panels is located in a fourth extended position adjacent to the primary display panel supported by a fourth extendable arm configured to slide the fourth auxiliary display panel from a fourth quadrant of the storage compartment through the slot to the fourth extended position;

a fifth auxiliary display panel of the set of auxiliary display panels is located in a fifth extended position adjacent to the first auxiliary display panel by a fifth extendable arm configured to slide the fifth auxiliary display panel from the first quadrant of the storage compartment through the slot to the fifth extended position;

a sixth auxiliary display panel of the set of auxiliary display panels is located in a sixth extended position adjacent to the second auxiliary display panel by a sixth extendable arm configured to slide the sixth auxiliary display panel from the second quadrant of the storage compartment through the slot to the sixth extended position;

a seventh auxiliary display panel of the set of auxiliary display panels is located in a seventh extended position adjacent to the third auxiliary display panel by a seventh extendable arm configured to slide the seventh auxiliary display panel from the third quadrant of the storage compartment through the slot to the seventh extended position; and an eighth auxiliary display panel of the set of auxiliary display panels is located in an eighth extended position adjacent to the fourth auxiliary display panel by an eighth extendable arm configured to slide the eighth auxiliary display panel from the fourth quadrant of the storage compartment through the slot to the eighth extended position.

8. An electronic display device, the device comprising:
a primary display panel mounted on a front side of a housing; and an auxiliary display panel of a set of auxiliary display panels is slidably extendable from a storage compartment within the housing, the auxiliary display panel is mounted to an extendable arm and configured to slide through a slot to an extended position adjacent to any one of a first lateral side, a second lateral side, a top side and a bottom side of the primary display panel at any given time, a proximal end of the extendable arm is pivotably coupled to a column, and the auxiliary display panel is pivotably coupled to a distal end of the extendable arm.

9. The device of claim 8, wherein the set of auxiliary display panels remain stored in the storage compartment in a stacked configuration.

10. The device of claim 8, wherein:
a first auxiliary display panel of the set of auxiliary display panels is positioned in a first quadrant of the storage compartment behind the primary display panel;
a second auxiliary display panel of the set of auxiliary display panels is positioned in a second quadrant of the storage compartment behind the primary display panel;
a third auxiliary display panel of the set of auxiliary display panels is positioned in a third quadrant of the storage compartment behind the primary display panel;
a fourth auxiliary display panel of the set of auxiliary display panels is positioned in a fourth quadrant of the storage compartment behind the primary display panel;
a fifth auxiliary display panel of the set of auxiliary display panels is positioned in the first quadrant of the storage compartment, wherein the fifth auxiliary display panel is positioned below the first auxiliary display panel in the first quadrant;
a sixth auxiliary display panel of the set of auxiliary display panels is positioned in the second quadrant of the storage compartment, wherein the sixth auxiliary display panel is positioned below the second auxiliary display panel in the second quadrant;
a seventh auxiliary display panel of the set of auxiliary display panels is positioned in the third quadrant of the storage compartment, wherein the seventh auxiliary display panel is positioned below the third auxiliary display panel in the third quadrant; and
an eighth auxiliary display panel of the set of auxiliary display panels is positioned in the fourth quadrant of the storage compartment, wherein the eighth auxiliary display panel is positioned below the fourth auxiliary display panel in the fourth quadrant.

11. The device of claim 8, wherein at least one of the set of auxiliary display panels remains stored in the storage compartment and at least one of the set of auxiliary display panels is positioned in an extended position adjacent to the primary display panel.

12. The device of claim 8, wherein:
a first auxiliary display panel of the set of auxiliary display panels is located in a first extended position adjacent to the primary display panel supported by a first extendable arm configured to slide the first auxiliary display panel from a first quadrant of the storage compartment through the slot to the first extended position;
a second auxiliary display panel of the set of auxiliary display panels is located in a second extended position adjacent to the primary display panel supported by a second extendable arm configured to slide the second auxiliary display panel from a second quadrant of the storage compartment through the slot to the second extended position;
a third auxiliary display panel of the set of auxiliary display panels is located in a third extended position adjacent to the primary display panel supported by a third extendable arm configured to slide the third auxiliary display panel from a third quadrant of the storage compartment through the slot to the third extended position;
a fourth auxiliary display panel of the set of auxiliary display panels is located in a fourth extended position adjacent to the primary display panel supported by a fourth extendable arm configured to slide the fourth auxiliary display panel from a fourth quadrant of the storage compartment through the slot to the fourth extended position;
a fifth auxiliary display panel of the set of auxiliary display panels is positioned in the first quadrant of the storage compartment;
a sixth auxiliary display panel of the set of auxiliary display panels is positioned in the second quadrant of the storage compartment;
a seventh auxiliary display panel of the set of auxiliary display panels is positioned in the third quadrant of the storage compartment; and
an eighth auxiliary display panel of the set of auxiliary display panels is positioned in the fourth quadrant of the storage compartment.

13. The device of claim 8, wherein each auxiliary display panel of the set of auxiliary display panels is positioned in an extended position adjacent to the primary display panel.

14. The device of claim 8, wherein:
a first auxiliary display panel of the set of auxiliary display panels is located in a first extended position adjacent to the primary display panel supported by a first extendable arm configured to slide the first auxiliary display panel from a first quadrant of the storage compartment through the slot to the first extended position;
a second auxiliary display panel of the set of auxiliary display panels is located in a second extended position adjacent to the primary display panel supported by a second extendable arm configured to slide the second auxiliary display panel from a second quadrant of the storage compartment through the slot to the second extended position;
a third auxiliary display panel of the set of auxiliary display panels is located in a third extended position adjacent to the primary display panel supported by a third extendable arm configured to slide the third auxiliary display panel from a third quadrant of the storage compartment through the slot to the third extended position;
a fourth auxiliary display panel of the set of auxiliary display panels is located in a fourth extended position adjacent to the primary display panel supported by a fourth extendable arm configured to slide the fourth auxiliary display panel from a fourth quadrant of the storage compartment through the slot to the fourth extended position;
a fifth auxiliary display panel of the set of auxiliary display panels is located in a fifth extended position adjacent to the first auxiliary display panel by a fifth extendable arm configured to slide the fifth auxiliary display panel from the first quadrant of the storage compartment through the slot to the fifth extended position;
a sixth auxiliary display panel of the set of auxiliary display panels is located in a sixth extended position adjacent to the second auxiliary display panel by a sixth extendable arm configured to slide the sixth auxiliary display panel from the second quadrant of the storage compartment through the slot to the sixth extended position;

a seventh auxiliary display panel of the set of auxiliary display panels is located in a seventh extended position adjacent to the third auxiliary display panel by a seventh extendable arm configured to slide the seventh auxiliary display panel from the third quadrant of the storage compartment through the slot to the seventh extended position; and an eighth auxiliary display panel of the set of auxiliary display panels is located in an eighth extended position adjacent to the fourth auxiliary display panel by an eighth extendable arm configured to slide the eighth auxiliary display panel from the fourth quadrant of the storage compartment through the slot to the eighth extended position.

* * * * *